July 1, 1941.  J. D. PHILLIPS  2,248,012
ROAD SWEEPER
Filed May 8, 1939   3 Sheets-Sheet 1
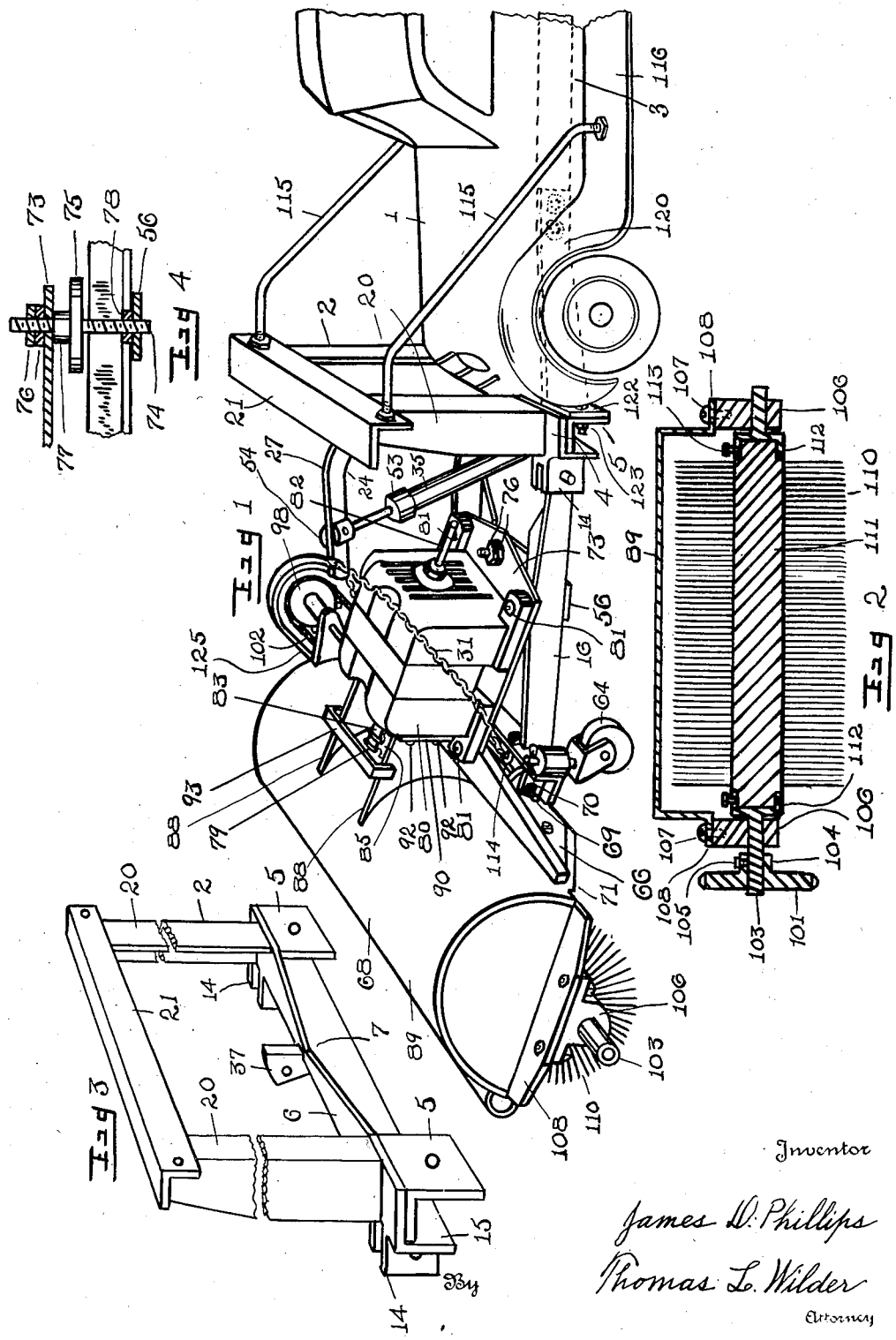
Inventor
James D. Phillips
Thomas L. Wilder
By  Attorney

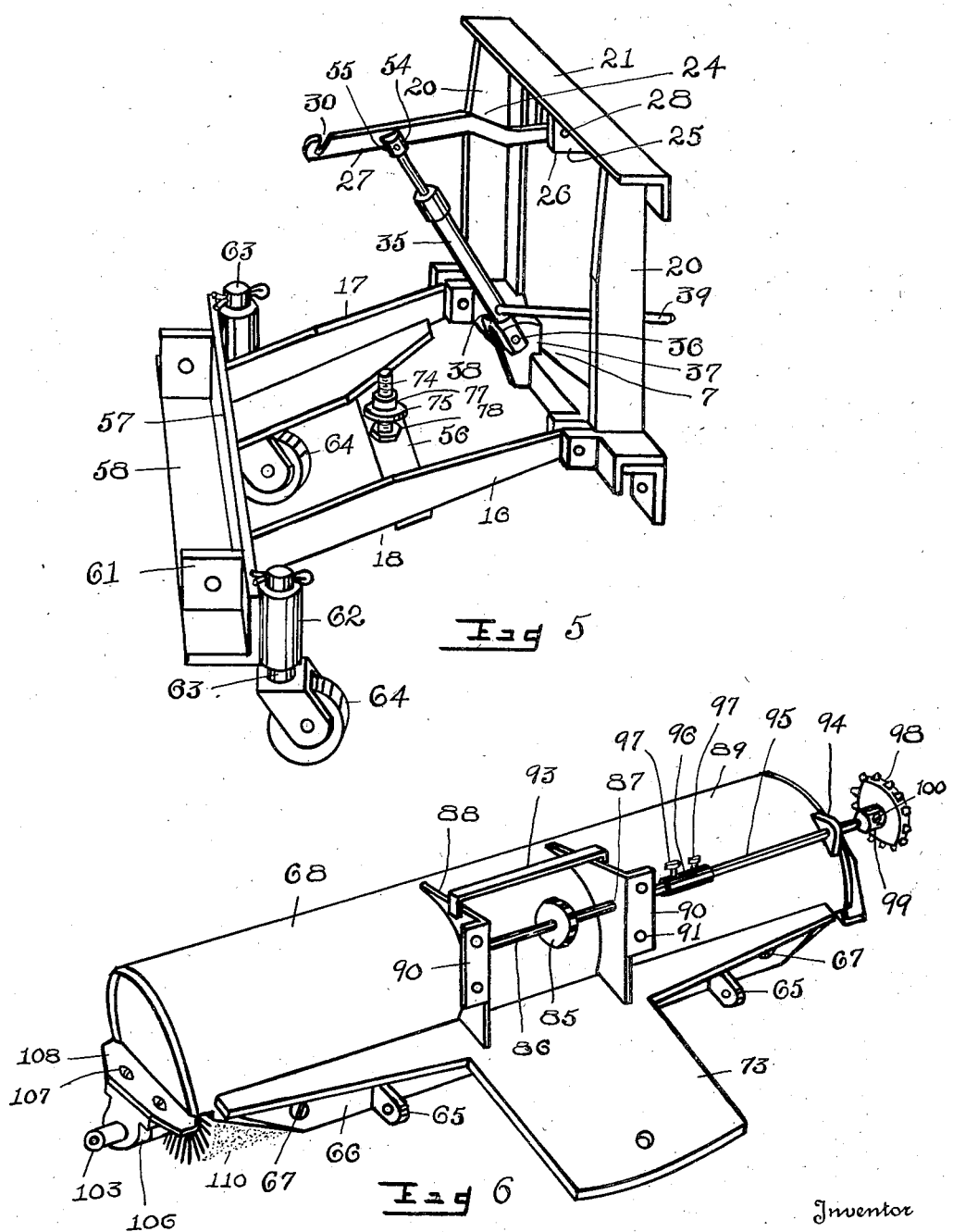

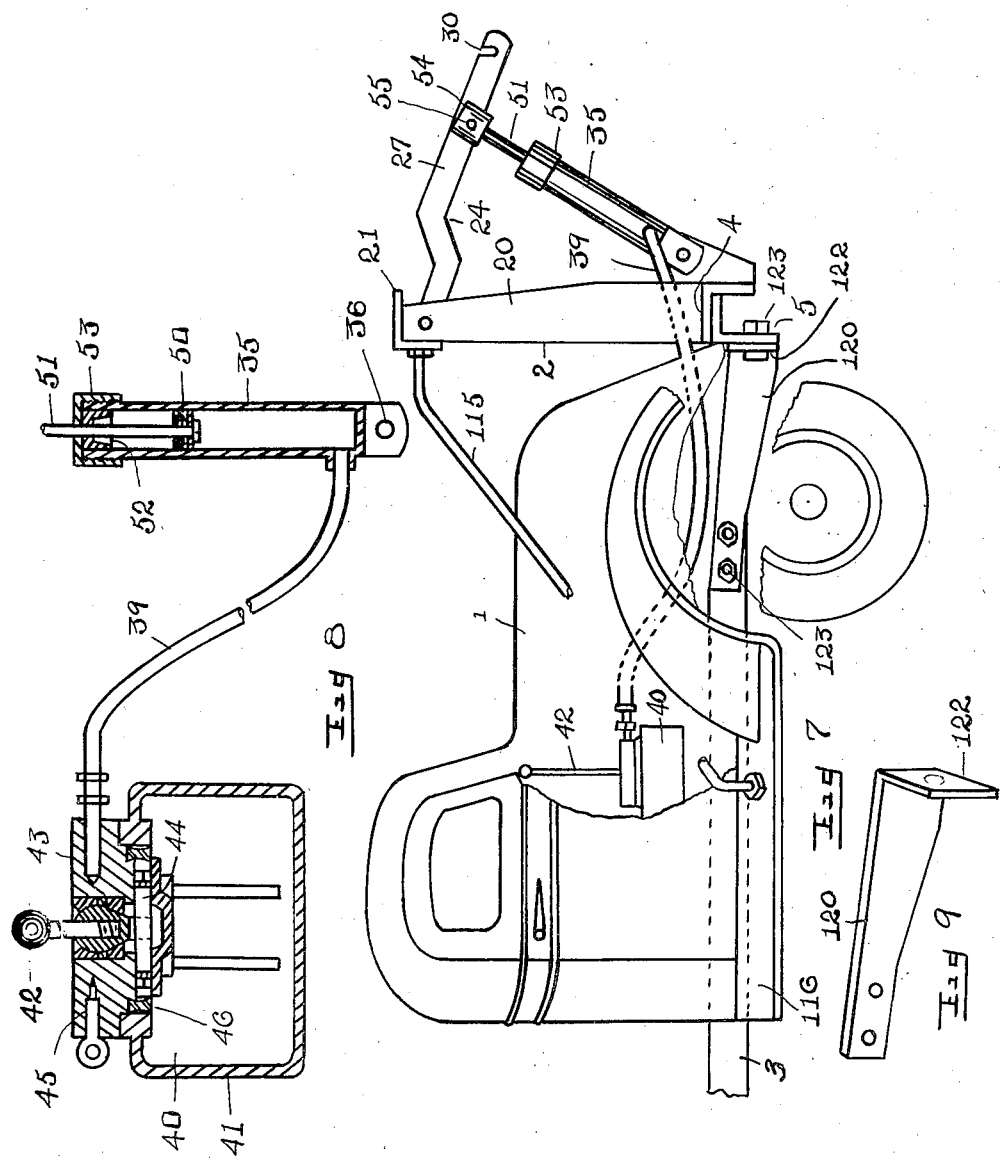

Patented July 1, 1941

2,248,012

UNITED STATES PATENT OFFICE 2,248,012

ROAD SWEEPER

James D. Phillips, Oriskany, N. Y.

Application May 8, 1939, Serial No. 272,301

2 Claims. (Cl. 15—82)

My invention relates to a road sweeper and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a road sweeper that can be removably attached to the front end of a truck, whereby a snow plow can be substituted when desired.

The object will be understood from the drawings in which

Fig. 1 is a perspective view of the sweeper showing it attached to the front end of an automobile.

Fig. 2 is detail view showing a vertical section of the sweeper.

Fig. 3 is a detail view somewhat enlarged showing a perspective of a part of frame employed for attaching the sweeper to the automobile, parts being broken away.

Fig. 4 is a detail view showing an adjusting bolt and immediate parts in section and broken away that are employed.

Fig. 5 is an enlarged view showing a perspective of the frame for connecting the sweeper to the chassis of the automobile truck.

Fig. 6 is a detail view somewhat enlarged showing the sweeper detached from the automobile truck.

Fig. 7 is a side elevation of the automobile showing a portion of the frame for attaching a sweeper in assembled position.

Fig. 8 is a detail view showing a dash pot and hand hydraulic pump employed, parts being in vertical section.

Fig. 9 is a detail view showing a perspective of a bracket employed to connect a part of the frame work to the chassis of the automobile truck.

Referring more particularly to the drawings, the front part of a truck is illustrated at 1. A frame 2 is attached to the front of the chassis 3 of the truck 1. Frame 2 consists of a base angle iron 4 formed with channel members 5, 5 at either end. The upper horizontal wall 6 of angle bar 4 is formed with a V shaped opening 7 to accommodate the front end of radiator part of truck 1.

Bearing members 14, 14 are formed integral with the forward depending flange 15 of base bar 4. Each of said bearing members 14 has its parts spaced for the reception of the respective end of angle irons 16 and 17 of the intermediate frame 18 hereinafter described.

Uprights 20, 20 are formed integral, welded or otherwise secured to angle bar 4. A cross angle iron 21 is supported in horizontal position on the tops of uprights 20, 20. A bearing 25 is formed at the central portion of cross angle iron 21. Said bearing 25 consists of two members 26, 26 spaced apart for housing the end of a lever 27 which is pivoted at 28 to said bearing 25. Lever 27 is bent at an angle at 24. An open slot 30 is made in its free end for holding a chain 31 hereinafter mentioned.

The means for rocking lever 27 on its pivot 28 embodies a hydraulic cylinder 35 having a cylindrical casing which is pivoted at 36 to an upstanding bracket 37 welded to base angle bar 4. The lower end of hydraulic cylinder 35 is bifurcated at 38 and straddles bracket 37, whereby to cooperate therewith in forming the bearing. Pivot 36 projects through aligned apertures made in the bifurcated part 38 of the casing of hydraulic cylinder 35 and of bracket 37. The lower end of the casing of hydraulic cylinder 35 is connected by a flexible tube 39 with any well known hand operated hydraulic pump 40, having a casing 41, rocker arm or handle 42, valve head 43, pump plunger 44, release valve 45, plug 46 and other related parts.

A piston 50 is disposed in hydraulic cylinder 35 and is connected to lever 27 by a piston rod 51. Piston rod 51 passes up through a gland 52 and a head 53 screw mounted to the casing of hydraulic cylinder 35. Its upper end is enlarged at 54 and pivoted at 55 to said lever 27.

The intermediate frame 18 having angle bars 16 and 17 hereinabove mentioned has a cross bar 56 welded beneath said angle bars 16 and 17 at about their middle location. The forward ends of said angle bars 16 and 17 are welded or otherwise secured to the vertically disposed flange 57 of cross angle iron 58, whereas their rear ends are pivoted at 59, 59 to forwardly projecting bearing 60, 60 made integral with the ends of base angle iron 4. Angle bar 17 is shorter than angle bar 16, whereby to hold the sweeper hereinafter mentioned at an angle to the chassis 3 of the truck 1.

Vertical disposed plates 61, 61 are welded or otherwise fastened to cross angle bar 58 adjacent the ends thereof.

Bearings 62, 62 are welded or in some other manner secured to the opposite rear surface adjacent the ends of the vertically disposed flange 57 of cross angle iron 58. The swivels 63, 63 of caster wheels 64, 64 are projected upward through the loose fitting apertures formed in bearings 62, 62. Wheels 64, 64 support the forward part of intermediate frame 18 above the surface of the road.

Complementary plates 65, 65 disposed in parallel planes are formed integral with cross angle iron 66 that is bolted at 67, 67, 67 to hood 68. Said plates 65, 65 cooperate with plates 61, 61 of cross angle iron 58 to form pivot bearings for shaft 69. Shaft 69 is projected through aligned apertures made in each set of plates 61, 65 and held in place by nuts 70, 70 screw mounted on either outer end of shaft 69, whereby to hold angle iron 66 and connected parts of the sweeper in detachable engagement with cross angle iron 58 of intermediate frame 18 and furthermore to form a pivot on which frame 71 of hood 68 of the sweeper can swing relative to intermediate frame 18. A platform 73 is formed integral or otherwise attached to the horizontal surface of angle iron 66. It extends rearwardly thereof and partially over frame 18. Its upper surface is flush with the upper horizontal surface of angle iron 66.

Platform 73 among other functions serves as a lever, whereby to hold frame 71 of hood 68 at a predetermined angle relative to intermediate frame 18.

The means for controlling the extent of rocking of frame 71 relative to intermediate frame 18 embodies screw bolt 74 mounted in a threaded aperture made in cross bar 56. A finger wheel 75 is formed integral with bolt 74, whereby to turn said bolt 74 in its threads in cross bar 56 for the purposes of vertical adjustment of the end of platform 73. The upper part of bolt 74 projects upwards through a loose aperture in platform 73. Lock nuts 76, 76 are mounted on bolt 74 above the surface of platform 73, whereby to hold said platform 73 against the upper surface of boss 77 made integral with wheel 75 formed on bolt 74. Bolt 74 is held in adjusted position relative to cross bar 56 by lock nut 78 mounted thereon and above said cross bar 56. It is locked in vertical position by turning nut 78 thereon against the upper surface of cross bar 56.

An internal combustion engine 80 is bolted at 81 to the upper surface of platform 72. Crank shaft 82 of engine 80 is extended at 83. A worm 79 is formed on the extended end 83 of crank shaft 82. It meshes with a worm gear 85 fixed to turn with shaft 86. Shaft 86 has bearings 87, 87 in brackets 88, 88 welded or otherwise securely fastened to the sweeper casing 89 of hood 68.

A flange 90 is made on each of the brackets 88, 88. Bolt holes 91, 91 are made in each of the flanges 90 to allow for the projection of bolts 92, 92 which engage and help hold the casing of internal combustion engine 80 in place. A tie member 93 is mounted across the tops of brackets 88, 88, whereby to aid in holding the outer free ends in given spaced relation to each other.

Shaft 86 projects at one end beyond the outer surface of brackets 88, 88. One of the projecting ends of shaft 86 is united to shaft 95 by a hollow sleeve 96 into which the adjacent end of shafts 86 and 95 project. Set bolts 97, 97 are mounted in threaded apertures in sleeve 96 to engage and hold said shafts 86 and 95, whereby they will turn together. Shaft 95 also has a loose bearing in lug 94 secured to casing 89 of hood 68 and projecting rearwardly therefrom adjacent the end of said casing 89.

A sprocket 98 is mounted on the free end of shaft 95 in a manner to turn therewith. To this end sprocket 98 has a boss 99 with a set screw 100 mounted in a threaded aperture therein and engaging shaft 95, whereby to cause sprocket 98 to turn with shaft 95.

Sprocket 98 is connected to sprocket 101 by a sprocket chain 102, whereby to transmit the rotation of sprocket 98 to sprocket 101. Sprocket 101 is mounted on one of the trunnions 103, 103 hereinafter mentioned in a manner to turn therewith. To this end sprocket 101 is equipped with a boss 104 having a set screw 105 mounted in a threaded aperture therein and adapted to engage the surface of trunnion 103.

Trunnions 103, 103 are mounted to turn in hanger bearings 106, 106 bolted at 107, 107 to the underside of horizontal flanges 108, 108 formed integral with casing 89 of the sweeper.

A sweeper brush 110 having a spindle or axle 111 is mounted at either end in the cup shaped members 112, 112 of trunnions 103, 103. The ends of spindle 111 are reduced and fit into cup shaped members 112, 112 and held to turn therewith by set bolts 113, 113.

Chain 31 hereinabove mentioned connects lever 27 with the forward part of intermediate frame 18. To this end the free ends of chain 31 are fastened to bolts 114, 114 mounted in suitable apertures made in the vertically disposed flange 57 of cross angle iron 58 adjacent the outer ends thereof.

Stay rods 115, 115 connect the cross angle iron 21, heretofore mentioned with the runnion boards 116, 116 of the automobile truck 2, whereby to aid in supporting the uprights 20, 20.

Furthermore, cleat brackets 120, 120 connect the forward part of the chassis 3 with the channel members 5, 5 at either end of base angle iron 4, referred to hereinabove. Each of the cleat brackets 120, 120 has a right angle wing 122 adapted to lie parallel with the corresponding outer surface of channel member 5, bolts 123 being used.

There is a casing 125 enclosing sprockets 98, 101 and sprocket chain 102, whereby to guard against accidents therewith.

In operation the sweeper casing 89 is attached to the intermediate frame 18 by projecting shaft 69 through the aligned apertures formed in cooperative plates 65, 65 of cross angle iron 66 and plates 61, 61 of cross angle iron 58.

Internal combustion engine 80 started by cranking the same by hand or by the use of an electric motor, not shown, is controlled by a governor, not shown.

In the event that the operator wishes to raise the sweeper off the surface of the road, whereby to travel without sweeping he will operate the pump handle 42 of the hydraulic pump 40, whereby to elevate the free end of lever 27 which through the chain 31 connection with angle iron 58 will elevate the intermediate frame 18 sufficiently to raise the wheels 64, 64 off the road and also raise the sweeper brush 110 above the surface of the road. In thus raising the sweeper brush 110 off the surface of the road, the frame 71 of the sweeepr 72 and intermediate frame 18 will rock upwards together on pivots 59, 59 connecting the rear ends of angle irons 16 and 17 with bearings 60, 60 of angle iron 4.

The brush 110 can be adjusted relative to the surface of the road by turning lock nuts 76.

Having thus described my invention what I claim as new and desire to secure by Letters Patent is as follows:

1. In a road sweeper, a frame detachably connected to said sweeper, said frame comprising a base bar, upright bars mounted on said base bar, another cross bar supported on top of said upright bars, a lever pivotally mounted to said last named cross bar, a hydraulic cylinder connected to said lever, other bars pivotally connected to said base bar, a cross bar carried by said last named bars, an adjutsable means mounted on said cross bar, whereby to control the angle of said sweeper relative to said frame and a chain connecting said other bars with said lever.

2. In a road sweeper, a frame detachably connected to said sweeper, said frame comprising a base bar, upright bars mounted on said base bar, another cross bar supported upon said upright bars, a lever pivotally mounted to said last named cross bar, a hydraulic cylinder connected to said lever, other bars pivotally connected to said base bar, a cross bar carried by said last named bars, and a chain connecting said other bars with said lever and means for forcing fluid pressure into said hydraulic cylinder, whereby to rock said detachable bars.

JAMES D. PHILLIPS.